United States Patent
Blanchflower et al.

(10) Patent No.: US 9,747,712 B2
(45) Date of Patent: Aug. 29, 2017

(54) DATA POINT ON A DISPLAY

(71) Applicant: Longsand Limited, Fort Collins, CO (US)

(72) Inventors: Sean Blanchflower, Cambridge (GB); Fernando Lucini, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 171 days.

(21) Appl. No.: 14/565,113

(22) Filed: Dec. 9, 2014

(65) Prior Publication Data
US 2016/0163074 A1   Jun. 9, 2016

(51) Int. Cl.
*G06T 11/20* (2006.01)

(52) U.S. Cl.
CPC .................. *G06T 11/206* (2013.01)

(58) Field of Classification Search
None
See application file for complete search history.

(56) References Cited

U.S. PATENT DOCUMENTS

| | | | |
|---|---|---|---|
| 7,428,710 B2 | 9/2008 | Robbins | |
| 7,593,013 B2 | 9/2009 | Agutter et al. | |
| 8,350,856 B1 | 1/2013 | Nazir et al. | |
| 2005/0028198 A1* | 2/2005 | Robbins | G06T 11/206 725/39 |
| 2005/0093866 A1* | 5/2005 | Ebert | G06Q 10/06 345/440 |
| 2005/0102316 A1* | 5/2005 | Lawson, Jr. | G06T 11/206 |
| 2009/0262131 A1* | 10/2009 | Suntinger | G06Q 50/34 345/619 |
| 2011/0057928 A1* | 3/2011 | Hasegawa | G06T 11/206 345/419 |
| 2011/0282705 A1* | 11/2011 | Vucina | G06Q 10/06 705/7.13 |
| 2012/0105453 A1* | 5/2012 | Cardno | G06F 17/30994 345/440 |

OTHER PUBLICATIONS

"Energy Visualisation"; http://prcweb.co.uk/energy.

* cited by examiner

*Primary Examiner* — James A Thompson
(74) *Attorney, Agent, or Firm* — Mannava & Kang, P.C.

(57) ABSTRACT

Examples disclosed herein relate, among other things, to a method. The method may include obtaining a data point associated with a first value and a second value, wherein the first value may represent a time associated with the data point. The method may also include determining a location based on the first and second values, and indicating or representing the data point on a display at the determined location.

20 Claims, 7 Drawing Sheets

DATA POINT ON A DISPLAY

BACKGROUND

As the amount and complexity of data obtained and processed by computers today are rapidly growing, it is important to find new ways of presenting the data to the users in a coherent and insightful manner, allowing the users to obtain maximum data insight in minimum time.

BRIEF DESCRIPTION OF THE DRAWINGS

The following detailed description references the drawings, wherein.

DETAILED DESCRIPTION

Vast amounts of data can be processed by computers today. The data may sometimes be obtained in the form of a plurality of data points. A data point may often be associated with a particular point in time as defined, for example, by a year, a month, a day, a time of the day, etc. A data point may also be associated with a time period, such as a period between two points in time. For example, a data point may correspond to an event that occurred at a particular time or that occurred over a particular period of time. Hereinafter, a data point may be described as being associated with a "temporal value" when it is associated with a particular time or time period.

In addition to the temporal value, the data point may also be associated with a set of one or more other parameters that may be referred to as "non-temporal values." A non-temporal value may be, for example, a numerical value (e.g., price, quantity, temperature, weight, etc.) or a non-numerical value (e.g., name, type, category, color, etc.). When numerous data points are presented to the user at once, presenting the data points on a display in a manner that reflects their temporal and non-temporal values may be desirable.

Examples disclosed herein describe, among other things, a computing system. The computing system may include, among other things, a display and a data processing engine to obtain a plurality of data points comprising a data point that is associated with at least a temporal value, a first non-temporal value and a second non-temporal value. The computing system may also include a data placement engine to determine a distance and a direction for the data point, where the distance is determined based at least on a first monotonic function of the temporal value, and the direction is determined based at least on the first non-temporal value, and represent the data point on the display at the determined distance from a predefined origin and in the determined direction from the predefined origin.

Figure 1:
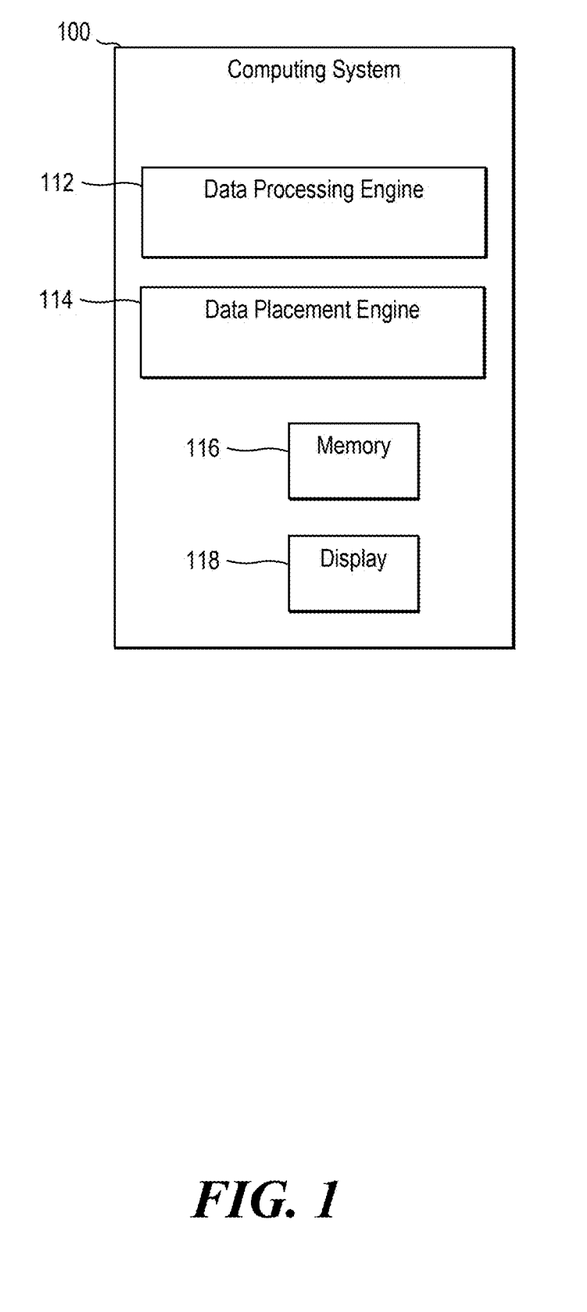
FIG. 1 is a block diagram of an example computing system.

FIG. 1 is a block diagram of an example computing system 100 for representing data points on a display. Computing system 100 may include one or more computing devices, where a computing device may include a smartphone, cell phone, tablet, phablet, laptop, desktop, server, application-specific computing device, any other processing device or equipment, or a combination thereof.

Computing system 100 may include or be communicatively coupled to a display 118, which may be implemented using any suitable technology, such as LCD, LED, OLED, TFT, Plasma, etc., and which in some examples may be a touch-sensitive display.

Computing system 100 may also include memory 116. Memory 116 which may include any type of volatile or non-volatile memory, such as a random-access memory (RAM), flash memory, hard drive, memristor-based memory, and so forth. Memory 116 may be an integral part of computing system 100, or it may be remote to computing system 100, but communicatively coupled to and accessible by computing system 100.

Computing system 100 may also include a data processing engine 112. Data processing engine 112 may generally represent any combination of hardware and programming. In some examples, data processing engine 112 may be configured to obtain and process a plurality of (e.g., two or more) data points. The data points may be obtained, for example, from a memory 116 or from another device local or remote to computing system 100. In some examples, the data points may be obtained from a remote device via at least one network. The network may be any combination of wired or wireless networks, wide-area and local-area networks, and may include any number of hubs, routers, switches, cell towers or the like. The network may be, for example, part of a cellular network, part of the Internet, part of an intranet and/or other type of network.

In some examples, each data point obtained by data processing engine 112 may include or be associated with at least one temporal value. As discussed above, the temporal value may correspond to or be associated with a particular time (e.g., a date and time at which a particular event occurred) or a period of time (e.g., a period of time over which an event occurred). For example, a temporal value associated with a data point may be "Jan. 1, 2014," "Jan. 1, 2014, 8:17:52.003 AM (UTC)," "Jan. 1, 2014-Jan. 17, 2014," "FY14Q1," and so forth.

In some examples, each obtained data point may also include a set of one or more non-temporal values. As discussed above, the non-temporal values may be numerical values or non-numerical values, and may include any relevant information describing the data point. For example, a data point may correspond to a sale, in which case the temporal value associated with the data point may include the date of the sale, and the non-temporal values associated with the data point may include the name of the salesperson, the sale price, the sold product, etc. As another example, a data point may correspond to one salesperson's quarterly sales, in which case the temporal value may identify the particular quarter, while the non-temporal values may include the name of the salesperson, the total quarterly sales amount, etc.

Computing system 100 may also include a data placement engine 114. Data placement engine 114 may generally represent any combination of hardware and programming. In some examples, data placement engine 114 may be configured to receive the plurality of data points from data processing engine 112. For all, some, or at least one data point from the received plurality of data points, data placement engine 114 may determine a display location at which to display the data point(s).

In some examples, to determine a display location for a data point, engine 114 may determine (e.g., calculate) a direction and a distance from a predefined origin at which to display the data point. The predefined origin may refer to a predefined point on the display around which the data points may be displayed or represented. In some examples, engine 114 may determine the distance from the origin based on the temporal value associated with the data point. For example, the distance may be a function of the temporal value (hereinafter, the "distance function").

In some examples, the distance function may be a monotonic function, such as a decreasing function, an increasing function, a strictly increasing function, or a strictly decreasing function of the temporal value. Thus, in some examples, the distance may increase (or at least not decrease) as the temporal value increases, or it may decrease (or at least not increase) as the temporal value decreases. Accordingly, the distance may indicate a point in time associated with the data point, which may, in some examples, be a point in time or at which a particular event (represented by the data point) occurred, or a period in time over which a particular event occurred. The distance function may be a linear function, or it may be a non-linear function such as an inverse function, a quadratic function, an exponential function, a logarithmic function, and so forth.

If the distance function is a strictly increasing or a strictly decreasing function, it may always map different temporal values into different distances. For example, a temporal value "Sep. 1, 2014" may be mapped into a first distance (e.g., 100 pixels away from the center, and a temporal value "Sep. 2, 2014" may be mapped into a second distance (e.g., 105 pixels away from the center). If, on the other hand, the distance function is an increasing or a decreasing function (but not a strictly decreasing or a strictly decreasing function) it may sometimes map two or more different temporal values into the same distance. For example, the distance function may map all temporal values that fall within the month of September, 2014 into a first distance (e.g., 100 pixels away from the center), and map all temporal values that fall within the month of October, 2014 into a second distance (e.g., 200 pixels away from the center).

As mentioned above, in addition to determining a distance from a predefined origin, data placement engine 114 may also determine, for a given data point, a direction from the predefined origin. In some examples, the direction may be defined as or correspond to an angle from a predefined direction or a predefined line crossing the predefined origin. For example, the direction may be defined as an angle (e.g., in degrees, radians, etc.) above or below a horizontal ("x") axis, to the left or to the right of a vertical ("y") axis, or to any side of any other line originating at the predefined origin.

In some examples, engine 114 may determine the direction (or angle) for a data point based at least on one non-temporal value associated with the data point. For example, if each data point in the plurality of data points is associated with a salesperson's name, the direction may be determined based on the salesperson's name. For example, for data points associated with the same name engine 114 may determine the same direction, and for data points associated with different names engine 114 may determine different directions. Thus, in some examples engine 114 may determine the same direction for all data points associated with the same non-temporal value. As will be further discussed below, this may cause such data points to be represented on or along the same radial line originating at the predefined origin In some examples, engine 114 may determine the direction (angle) for a data point based on a function (hereinafter, "the direction function") of at least one non-temporal value associated with the data point. For example, if a data point is associated with a dollar amount, engine 114 may determine the direction as a function of the dollar amount. In other words, engine 114 may map a non-temporal value of each data point into a direction or an angle. In some examples, the direction function may take into account the minimum and maximum values of the non-temporal value across all data points, and map the minimum value into a predefined minimal angle (e.g., 0 degrees), while mapping the maximum value into a maximum angle (e.g., 360, 180, or 90 degrees, depending on the desired plot shape).

In some examples, the direction function may be a monotonic function, such as a decreasing function, an increasing function, a strictly increasing function, or a strictly decreasing function of the non-temporal value. Thus, in some examples, the angle may increase (or at least not decrease) as the non-temporal value increases, or it may decrease (or at least not increase) as the non-temporal value decreases. The direction function may be a linear function, or it may be a non-linear function such as an inverse function, a quadratic function, an exponential function, a logarithmic function, and so forth.

If the direction function is a strictly increasing or a strictly decreasing function, it may always map different non-temporal values into different directions or angles. For example, a non-temporal value $11,000 may be mapped into a first angle (e.g., 47 degrees) and a non-temporal value $12,000 may be mapped into a second angle (e.g., 48 degrees). If, on the other hand, the direction function is an increasing or a decreasing function (but not a strictly decreasing or a strictly decreasing function), it may sometimes map two or more different non-temporal values into the same angle. For example, the direction function may map all non-temporal values between $5,000 and $14,999 into a 45-degree angle, all values between $15,000 and $24,999 into a 90-degree angle, and so forth.

While some examples discussed herein describe the plurality of data points as a plurality of discrete data points, it is appreciated that the systems and methods described herein may also be applicable to representation of continuous data. Also, while in some examples each data point obtained by engine 112 may include or be associated with a temporal value, in other examples, some of the obtained data points may not include or be associated with temporal values. Such data points may be ignored by engine 112, or be automatically assigned a temporal value, such as a default temporal value or a temporal value of a previously received data point.

After determining the distance and the direction (angle) for a given data point, data placement engine 114 may represent or indicate the data point on a display (e.g., display 118) at the determined distance and in the determined direction (at the determined angle) from the predefined origin. For brevity, the determined distance and the determined direction from the predefined origin may be referred to as the determined location. In some examples, the determined location may be defined using a polar coordinate system. In such examples, the predefined origin may be referred to as the predefined pole, the distance from the predefined pole may be referred to as the radial coordinate, and the direction (angle) may be referred to as the angular coordinate or the polar angle.

Representing the data point at the determined location on the display may include displaying, at or near the determined location a representation of one or more non-temporal values associated with the data point, which may or may not include the non-temporal value used for determining the direction (angle) component of the location. The representation of a non-temporal value at the determined location may be in the form of a numerical (e.g., digital) representation, a symbolic representation, or any other type of representation that can visually represent or indicate the magnitude of the non-temporal value, or an approximation thereof. As mentioned above, displaying a representation of the data point on a display may also be referred to as displaying or providing for display an indicator associated with and the data point or representing the data point.

In some examples, the representation (or the indicator) may be in the form of a certain shape (e.g., circle, rectangle, dot, line section, etc.) having a certain color, pattern, size, and other parameters. In such examples, engine 114 may display (or provide for display) a shape whose one or more parameters correspond to or are associated with the magnitude of the non-temporal value. For example, engine 114 may display or provide for display a circle whose radius is proportional to the magnitude of the non-temporal value.

As mentioned above, in some examples, engine 114 may represent or indicate more than one non-temporal value associated with the data point at the determined location. For example, if a data point is associated with three non-temporal values (e.g., price, quantity, and product type), a first non-temporal value (e.g., price) may be used by engine 114 to determine the direction, while a second non-temporal value (e.g., quantity) and a third non-temporal value (e.g., product type) may be represented at the determined location. For example, the second and third non-temporal values may be represented by a circle whose radius corresponds to the quantity and whose color corresponds to the product type associated with the data point. It is appreciated that any number of non-temporal values may be represented by engine 114 at the determined location. For example, engine 114 may display or provide for display at the determined location one or more shapes, each shape having one or more parameters, where the parameters may be chosen by engine 114 to visually represent the non-temporal values. It is appreciated that the term "shape" as used herein may include any combination of simple or complex shapes, charts, plots, graphs, or any other graphics or images suitable for representing values.

In some examples, after a data point becomes represented on a display (e.g., display 118), engine 114 may receive a user input associated with the data point's representation on the display. The user input may include a mouse click or a touch by the user at or near the determined location on the display, e.g., within a predefined distance from the location at which the data point is represented. In response to receiving the user input, engine 114 may provide for display information associated with the data point. The information may include information already reflected on the display and/or supplemental information that is not yet reflected or is only approximately reflected. Supplemental information may include, for example, exact values of any temporal or non-temporal values associated with the data point.

In some examples, engine 114 may also display or provide for display (e.g., on display 118) one or more distance markers indicating the temporal values corresponding to one or more determined distances, and one or more direction (angle) markers indicating the non-temporal values corresponding to one or more determined directions (angles). While in some examples provided herein, the data points and the various indicators are described as being displayed on or provided for display, in other examples engine 114 may print (or provide for printing) the data points and the various indicators discussed above onto a paper or any other printable material or surface.

Figure 2:
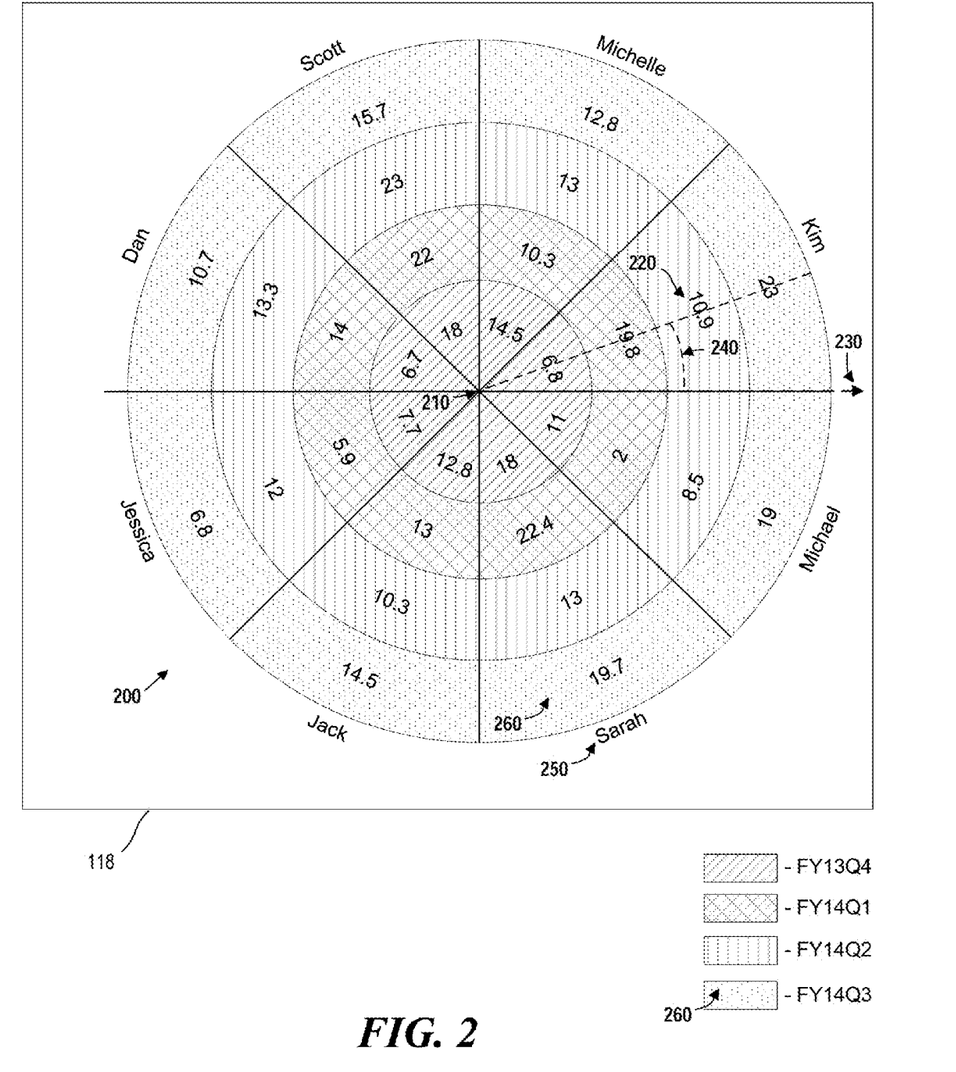
FIG. 2 illustrates an example plot of data points.

FIG. 2 illustrates an example display 118 on which a plot 200 having a predefined origin 210 is displayed. Plot 200 includes, among other things, representations of a plurality of data points that includes a data point 220. In the example of FIG. 2, each data point obtained by data processing engine 112 and passed to data placement engine 114 describes an amount of total quarterly sales (e.g., in thousands of dollars) by one of eight salespersons (Kim, Michelle, Scott, etc.) in one of four quarters (FY13Q4, FY14Q1, FY14Q2, and FY14Q3). Thus, each data point is associated with a temporal value representing the quarter, and with at least two non-temporal values: the salesperson's name and the salesperson's total quarterly sales. For example, if each data point is described as an entry in a table (stored, for example, in memory 116), the entry for data point 220 may look as follows:

| Quarter | Name | Total Sales |
|---------|------|-------------|
| FY14Q2 | Kim | 10.9 (thousand USD) |

In the example of FIG. 2, engine 114 determines (e.g., calculates) the distance from predefined origin 220 for each data point based on the temporal value representing the quarter. Specifically, in this example, the distances are determined chronologically: shorter distances are determined for earlier quarters and longer distances are determined for later quarters. Thus, the distance determined for data point 220 is the same as distances determined for other data points associated with FY14Q2, is longer than distances determined for data points associated with FY13Q4 and FY14Q1, and is shorter than distances determined for data points associated with FY14Q3.

In this example, engine 114 also determines, for each data point, a direction (angle) from a horizontal axis 230. In this example, the directions are determined based on the non-temporal value of the salesperson's name. Thus, a direction (angle) 240 is determined for all data points associated with the salesperson "Kim," while other directions are determined for data points associated with other salespersons.

As described above, after determining the location (distance and direction) for each (or at least one) data point from the plurality of data points, engine 114 may represent the data point at the determined location, for example, by representing one or more non-temporal values associated with the data point at or near the determined location. In the example of FIG. 2, engine 114 represents each data point by displaying the numerical (digital) representation of its total quarterly sales value at or near the determined direction. In addition, engine 114 displays direction (angle) markers (e.g., 250) indicating the non-temporal values corresponding to each determined direction (angle), and distance markers (e.g., 260) indicating the temporal values corresponding to each determined distance.

Figure 3:
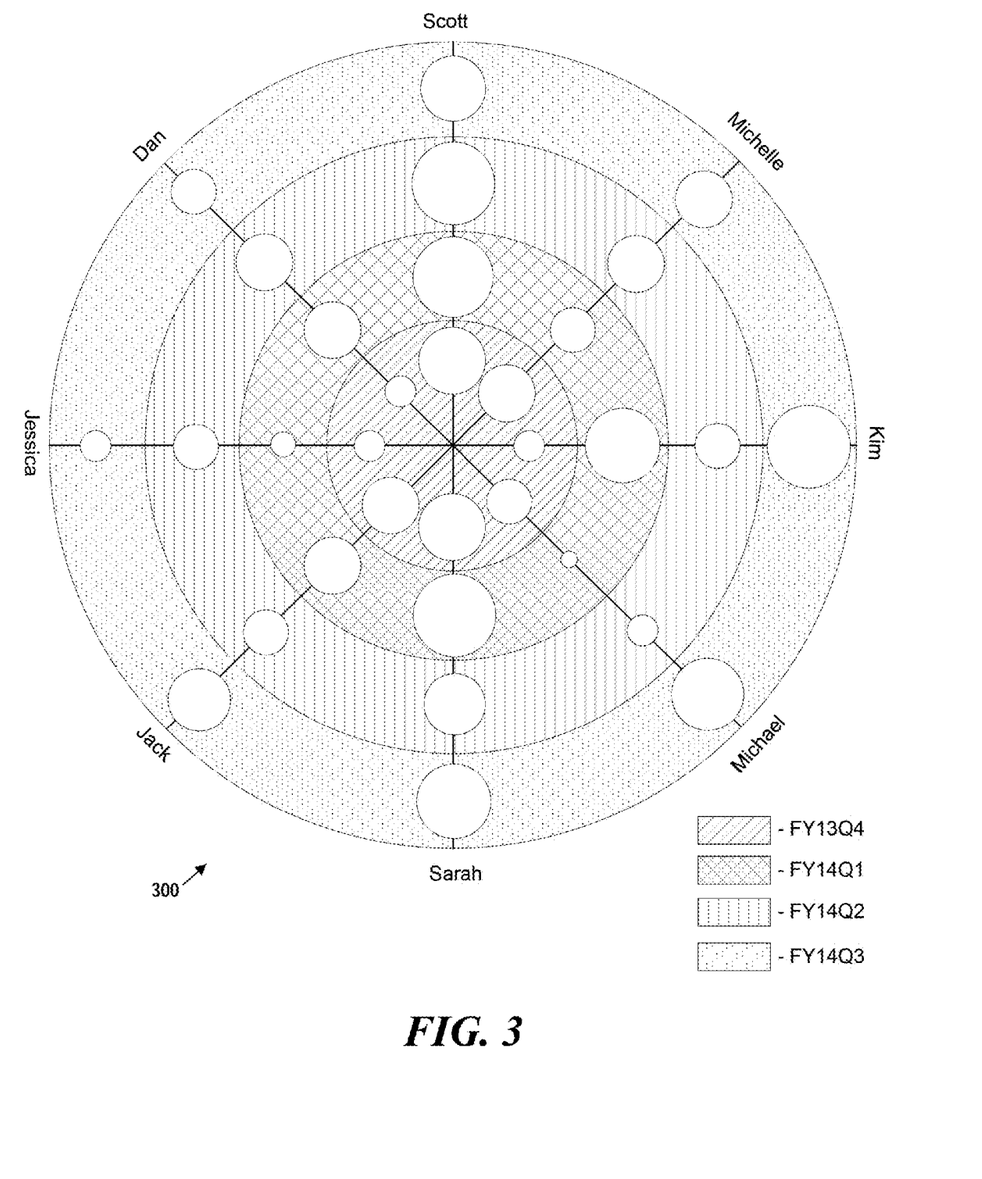
FIG. 3 illustrates another example plot of data points.

FIG. 3 illustrates another example plot 300. Plot 300 may represent data points similar to the data points represented in plot 200 of FIG. 2. Instead of representing each data point by displaying its associated quarterly sales value in a numeric (digital form), plot 300 represents the quarterly sale values using circles whose radii correspond to (e.g., are proportional to) the quarterly sale values.

Figure 4:
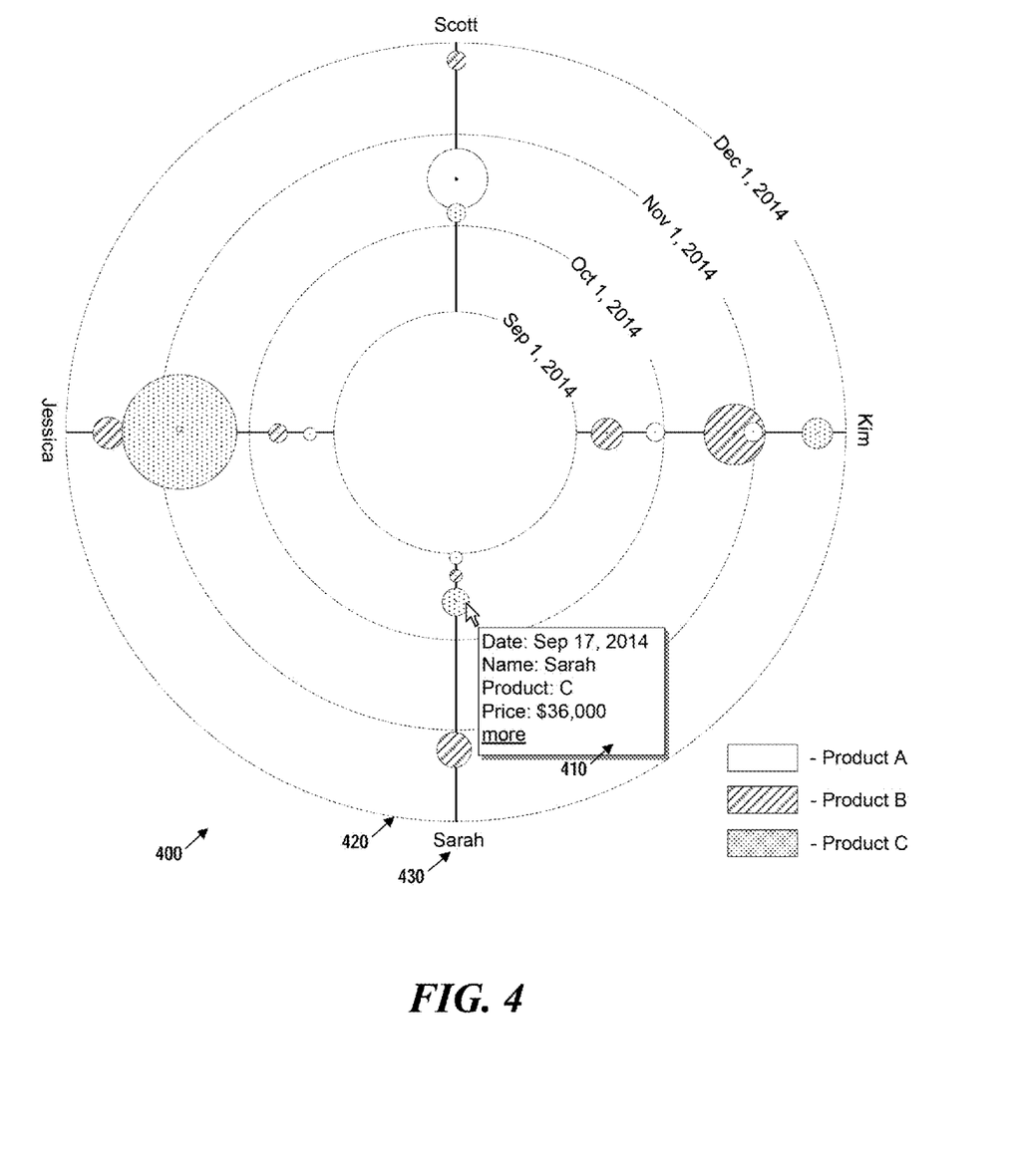
FIG. 4 illustrates another example plot of data points.

FIG. 4 illustrates another example plot 400. In this example, each data point is associated with a temporal value (a sale date) and at least three non-temporal values (salesperson's name, product type, and the sale price). In this example, engine 114 determines the distance for each data point using a strictly increasing function of the sale date of the data point. Thus, for two different sale dates, two different distances will be determined. In this example, engine 114 determines the direction (angle) for each data point based on the name of the salesperson associated with the data point. After determining the location (direction and distance) for a data point, engine 114 represents the data point using a circle whose center is at the determined location, whose size (radius) corresponds to (e.g., is proportional to) the sale price, and whose pattern corresponds to the type of product sold.

In the example of FIG. 4, engine 114 may also be configured to receive or detect a user input associated with one or more data points as represented on plot 400. For example, engine 114 may receive or detect a mouse click or touch at or near a location at which a certain data point is represented. In response to the received or detected user input, engine 114 may display information associated with the data point, such as information 410. Information 410 may include values already represented on plot 400 (e.g., sale date, salesperson's name, and product type) as well as values not already represented on plot 400 (e.g., sale price). Information 410 may also include a link (e.g., a hyperlink) to additional information associated with the data point. Plot 400 may also include one or more direction (angle) markers (e.g., 430) and distance markers (e.g., 420).

Figure 5:
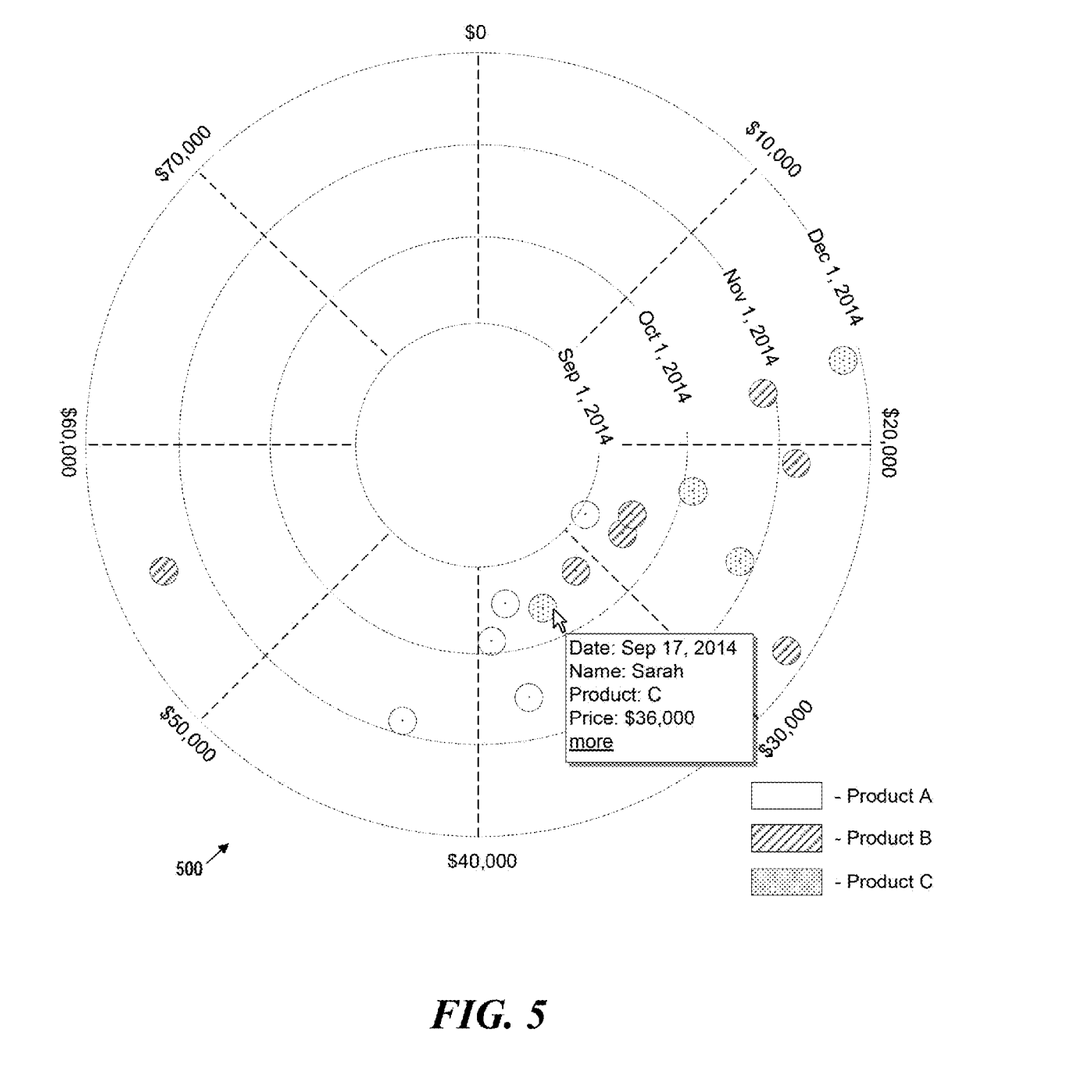
FIG. 5 illustrates another example plot of data points.

FIG. 5 illustrates another example plot 500. Plot 500 may represent data points similar to the data points represented in plot 400 of FIG. 4, but in plot 500 the direction for each data point is determined using a strictly increasing linear function of the sale price, instead of the salesperson's name.

In the foregoing discussion, engines 112 and 114 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like.

Figure 6:
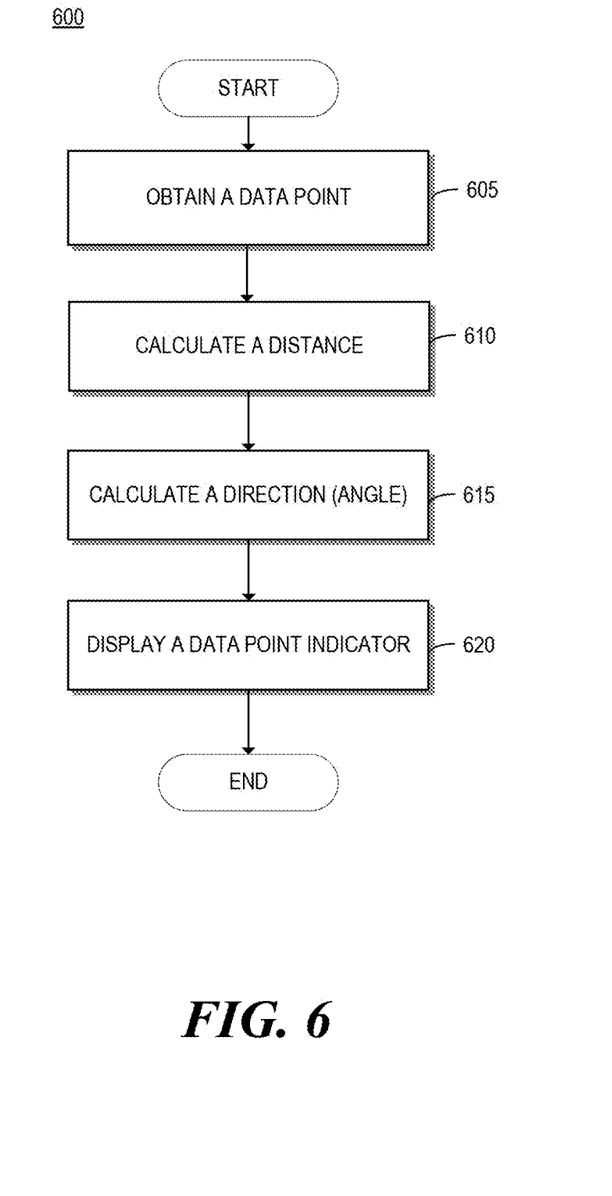
FIG. 6 shows a flowchart of an example method for displaying a data point.

FIG. 6 is a flowchart of an example method 600 for displaying a data point. Method 600 may be described below as being executed or performed by a system or by a computing device such as computing system 100 of FIG. 1. Other suitable systems and/or computing devices may be used as well. Method 600 may be implemented in the form of executable instructions stored on at least one non-transitory machine-readable storage medium of the system and executed by at least one processor of the system. Alternatively or in addition, method 600 may be implemented in the form of electronic circuitry (e.g., hardware). In alternate examples of the present disclosure, one or more blocks of method 600 may be executed substantially concurrently or in a different order than shown in FIG. 6. In alternate examples of the present disclosure, method 600 may include more or less blocks than are shown in FIG. 6. In some examples, one or more of the blocks of method 600 may, at certain times, be ongoing and/or may repeat.

At block 605, method 600 may obtain a data point associated with a first (e.g., temporal) value and a second value. As discussed above, the first value may represent a time (or a time period) associated with the obtained data point. At block 610, the method may calculate a distance from a predefined origin on a display (e.g., display 118) based at least on the first value. In some examples, the distance may be calculated using an increasing, decreasing, strictly increasing, or strictly decreasing function of the first value. In some examples, the distance may be proportional to the first value. At block 615, the method may calculate an angle from a predefined line crossing the predefined origin based at least on the second value. In some examples, the distance may be calculated using an increasing, decreasing, strictly increasing, or strictly decreasing function of the first value. In some examples, the angle may be proportional to the second value. At block 620, the method may display an indicator of the data point at the calculated distance from the predefined origin, and at the calculated angle from the predefined line. In some examples, the indicator may include a shape representing at least a third value associated with the data point. In some examples, the indicator may include a shape representing at least a third value and a fourth value associated with the data point. In some examples, in addition to the indicator of the data point, the method may also display at least one of: i) a plurality of distance markers indicating a plurality of distances from the predefined origin, and ii) a plurality of angle markers indicating a plurality of angles from the predefined line.

Figure 7:
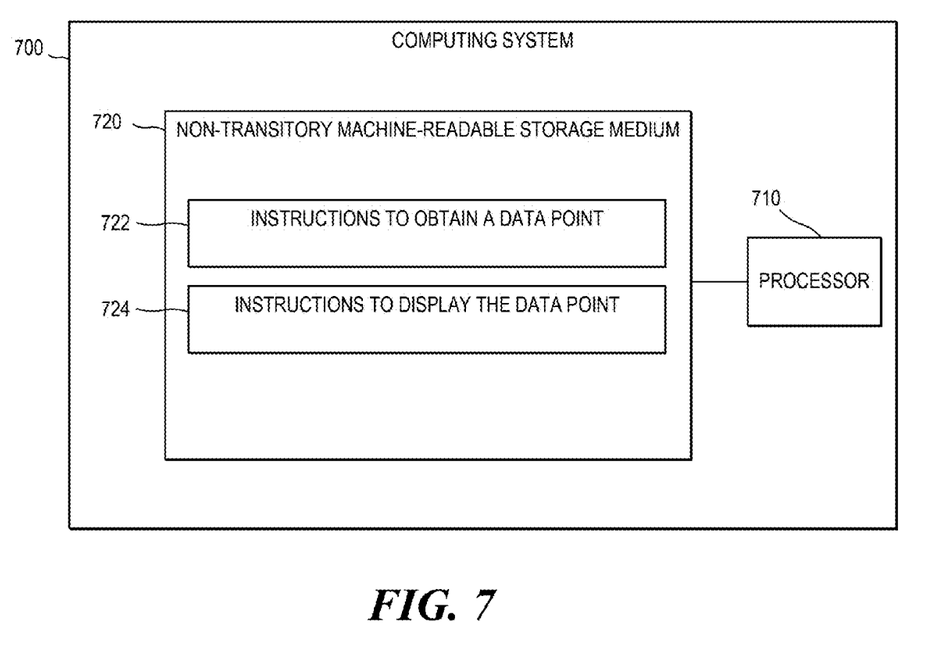
FIG. 7 is a block diagram of another example computing device.

FIG. 7 is a block diagram of an example computing system 700 for displaying a data point on a display. Computing device 700 may be similar to computing system 100 of FIG. 1. In the example of FIG. 7, computing device 700 includes a processor 710 and a non-transitory machine-readable storage medium 720. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in non-transitory machine-readable storage medium 420. In the particular example shown in FIG. 7, processor 710 may fetch, decode, and execute instructions 722, 724, or any other instructions (not shown for brevity) to generate one or more reports. As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 720 may be any electronic, magnetic, optical, or other physical storage device that stores executable instructions. Thus, medium 720 may be, for example, Random Access Memory (RAM), an Electrically-Erasable Programmable Read-Only Memory (EEPROM), a storage drive, an optical disc, and the like. Medium 720 may be disposed within computing device 700, as shown in FIG. 7. In this situation, the executable instructions may be "installed" on computing device 700. Alternatively, medium 720 may be a portable, external or remote storage medium, for example, that allows computing device 700 to download the instructions from the portable/external/remote storage medium. In this situation, the executable instructions may be part of an "installation package". As described herein, medium 720 may be encoded with executable instructions for obtaining and displaying a data point.

Referring to FIG. 7, instructions 722, when executed by a processor (e.g., 710), may cause a computing device (e.g., 700) to obtain a data point from a plurality of data points, where the data point may be associated with at least a first value and a second value, where the first value may represent a time or a time period.

Instructions 724, when executed by a processor (e.g., 710), may cause a computing device (e.g., 700) to display the data point on a display (e.g., 118) such that a radial coordinate of the data point relative to a predefined pole reflects the first value, and the angular coordinate of the data point reflects the second value. In some examples, the radial coordinate may be proportional to the first value, and the angular coordinate may be proportional to the second value. In some examples, displaying the data point may include displaying at least one of a number and a shape representing a third value associated with the data point.

The invention claimed is:

1. A computing system comprising:
   a display;
   a data processing engine to obtain a plurality of data points comprising a data point that is associated with at least a temporal value, a person identifier, and a monetary value; and
   a data placement engine to:
      determine a first distance and a direction for the data point,
         wherein the first distance is determined based at least on a first monotonic function of the temporal value associated with the data point,
         wherein the first monotonic function maps a plurality of data points having different respective temporal values that fall within a temporal range to a second distance,
         wherein the direction corresponds to an angle, and wherein the placement engine is further to determine the angle based on a second function of the person identifier associated with the data point, and
      represent the data point on the display as a circle located at the first distance from a predefined origin and in the determined direction from the predefined origin,
         wherein a radius of the circle corresponds to the monetary value associated with the data point.

2. The computing system of claim 1, wherein the temporal value associated with the data point corresponds to at least one of a time period and a point in time.

3. The computing system of claim 1, wherein a color of the circle corresponds to an item type associated with the data point.

4. The computing system of claim 1, wherein a pattern of the circle corresponds to an item type associated with the data point.

5. The computing system of claim 1, wherein the placement engine is further to:
   receive user input associated with the data point; and
   display, in response to the user input, supplemental information associated with the data point.

6. The computing system of claim 1, wherein a color of the circle corresponds to an item quantity associated with the data point.

7. The computing system of claim 1, wherein the first distance and the second distance are the same.

8. A method comprising:
   obtaining a data point associated with a first value, a person identifier, and a monetary value, wherein the first value represents a time associated with the data point;
   calculating a distance from a predefined origin based at least on the first value associated with the data point and according to a first function, wherein the first function maps a plurality of different respective values that fall within a range to the distance;
   calculating an angle from a predefined line crossing the predefined origin based at least on the person identifier associated with the data point and according to a second function;
   displaying a first indicator of the data point on a display at the calculated distance from the predefined origin and at the calculated angle from the predefined line, the first indicator having a first visual characteristic corresponding to the monetary value associated with the data point; and
   displaying a second indicator of the data point in response to a user input selecting the first indicator.

9. The method of claim 8, wherein the distance is proportional to the first value.

10. The method of claim 8, wherein the first indicator is a circle.

11. The method of claim 10, wherein the first visual characteristic is a radius of the first indicator.

12. The method of claim 11, wherein the radius of the first indicator is proportional to the monetary value associated with the data point.

13. The method of claim 8, wherein the first function comprises one of a decreasing function and an increasing function.

14. The method of claim 8, wherein the second function comprises one of a strictly decreasing function, a decreasing function, a strictly increasing function, and an increasing function.

15. The method of claim 8,
   the first indicator having a second visual characteristic corresponding to an item type, wherein the second visual characteristic is a pattern of the first indicator.

16. A non-transitory machine-readable storage medium encoded with instructions executable by at least one processor of at least one computing device to cause the computing device to:
- obtain a data point from a plurality of data points, wherein the data point is associated with at least a first value, a person identifier, and a monetary value, wherein the first value represents a time; and
- display a first indicator representing the data point on a display such that a first radial coordinate of the data point relative to a predefined pole reflects a first function of the first value, the angular coordinate of the data point reflects a second function of the person identifier, and a visual characteristic of the first indicator corresponds to the monetary value,
- wherein the first function maps a plurality of different values to a second radial coordinate relative to the predefined pole.

17. The non-transitory machine-readable storage medium of claim 16, wherein the visual characteristic is a size of the first indicator.

18. The non-transitory machine-readable storage medium of claim 16, wherein the first function is a monotonic function, and the second function is a monotonic function.

19. The non-transitory machine-readable storage medium of claim 16, wherein the visual characteristic is a color of the first indicator.

20. The non-transitory machine-readable storage medium of claim 19, wherein the color of the first indicator corresponds to an item quantity associated with the data point.

* * * * *